April 15, 1930.  A. B. CADMAN  1,755,100
TRAILER VEHICLE
Filed Dec. 26, 1925  3 Sheets-Sheet 1
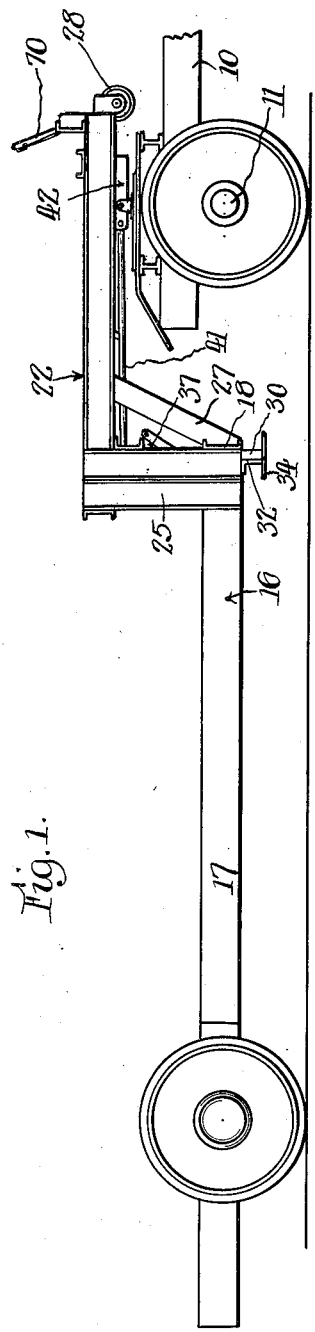
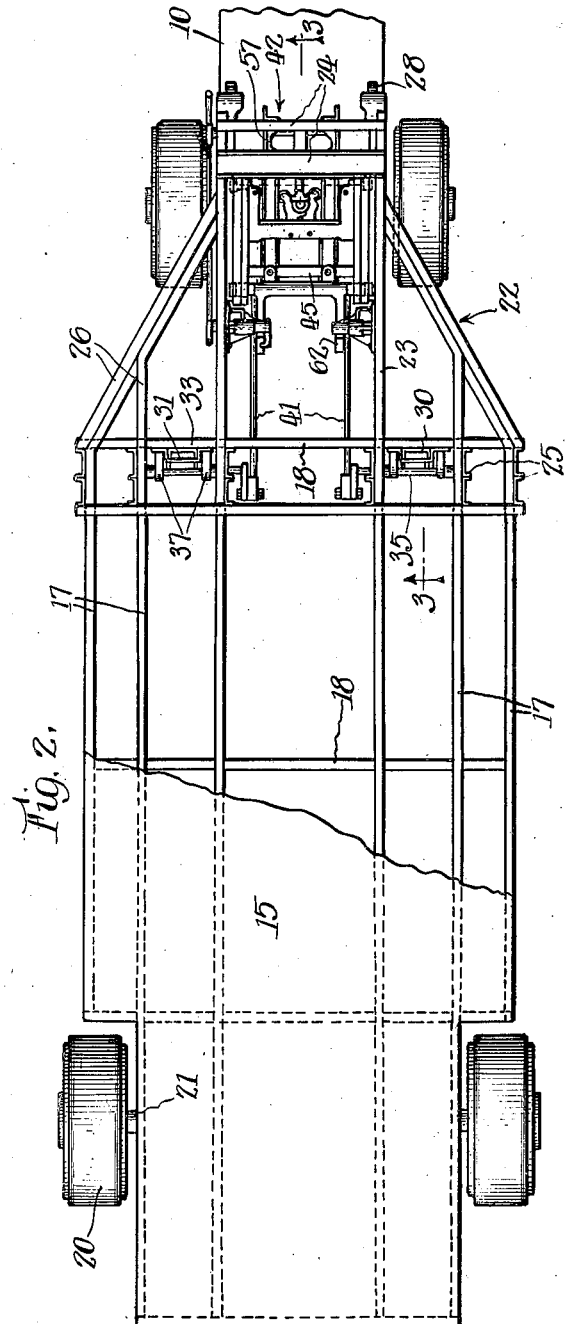
Inventor:
Addi B. Cadman, April 15, 1930.  A. B. CADMAN  1,755,100
TRAILER VEHICLE
Filed Dec. 26, 1925   3 Sheets-Sheet 2

Inventor:
Addi B. Cadman,
By Chindell Parker Carlson
Attys.

April 15, 1930.  A. B. CADMAN  1,755,100
TRAILER VEHICLE
Filed Dec. 26, 1925   3 Sheets-Sheet 3
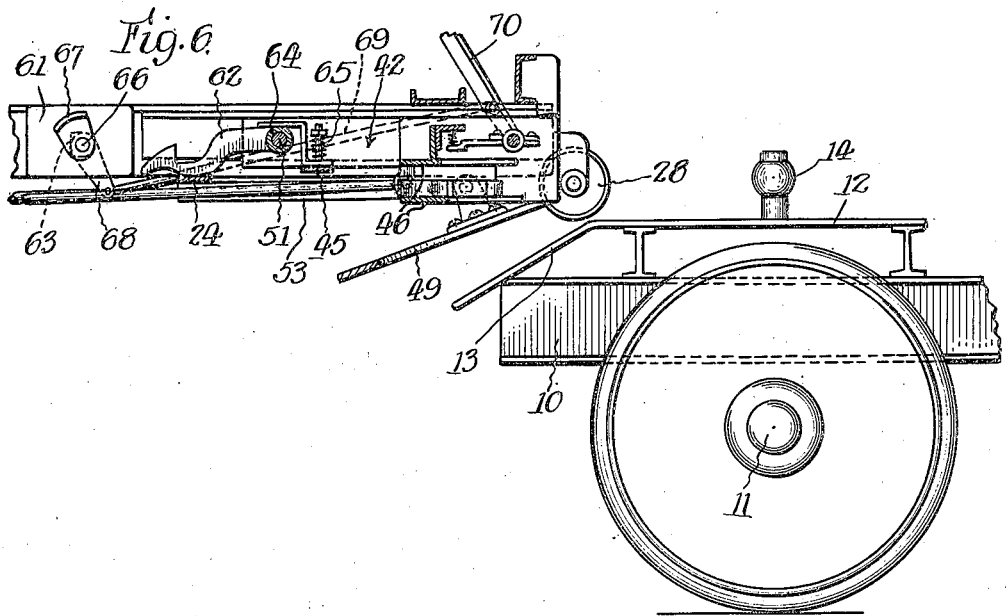
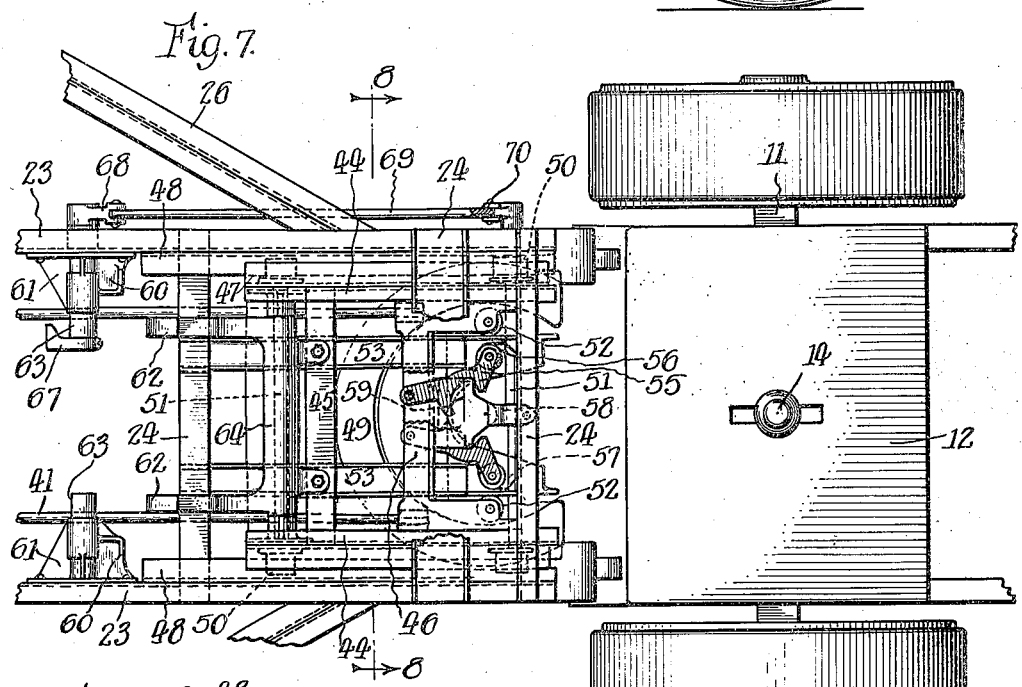
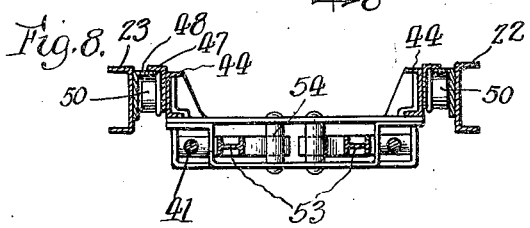
Inventor:
Addi B. Cadman,
By Churchill Parker Paulson
Attys.

Patented Apr. 15, 1930

1,755,100

UNITED STATES PATENT OFFICE

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN

TRAILER VEHICLE

Application filed December 26, 1925. Serial No. 77,725.

My invention relates to a vehicle comprising a tractor section and a so-called semi-trailer which are adapted to be coupled together for combined operation. The invention has particular reference to improvements in the construction of the trailer.

The general object of the invention is to provide an improved semi-trailer having a low load platform and a novel means for maintaining the forward end of the platform at substantially the same level regardless of whether the trailer is coupled to or uncoupled from the tractor section of the vehicle.

In the sense herein employed, a trailer with a low load platform is one in which the load platform is positioned below the level of the frame of the tractor or so close to the ground that only a narrow clearance space is provided beneath the frame upon which the platform is built. Trailers of this type are generally used in moving cumbersome pieces of machinery and the like in order to avoid raising the machines any material distance in loading them onto the trailer. The movable supporting legs used on ordinary semi-trailers are not applicable to trailers of the present type owing to small clearance space beneath the platform frame of the trailer.

A more specific object of the invention therefore is to provide a trailer having a low load platform and novel landing mechanism at the forward end of said platform arranged to rest upon the ground and support the trailer when it is detached from the tractor and to be moved into a substantially disappearing or non-supporting position so that proper clearance between the landing mechanism and the ground will be maintained during combined operation of the tractor and trailer.

The invention also aims to provide a tractor having parallel frame portions one adapted to overlie and rest upon the rear end of an ordinary tractor and the other disposed substantially below the frame of the tractor and constituting a load platform, and means mounted to slide horizontally in said overlying frame portion and operable to actuate a landing mechanism located near the forward end of the load platform.

Another object of the invention is to provide a semi-trailer having vertically slidable supporting members and novel means for moving said members into and out of supporting position including toggle mechanism arranged to be actuated automatically during coupling and uncoupling of the tractor and trailer and to sustain the weight of the trailer upon the supporting members.

Other objects and advantages will become apparent from the following detailed description taken in connection with the accompanying drawings in which Figure 1 is a side elevation of a trailer and a portion of a tractor embodying the features of the present invention.

Fig. 2 is a fragmentary plan view showing the tractor and trailer coupled together.

Fig. 3 is a section taken along the line 3—3 of Fig. 2.

Fig. 4 is a fragmentary sectional view of a portion of Fig. 3 showing the position of the landing mechanism when the trailer is detached from the tractor.

Fig. 5 is a section taken along the line 5—5 of Fig. 3.

Fig. 6 is a fragmentary view of the tractor and trailer in uncoupled relation and showing the trailer coupling mechanism in vertical section.

Fig. 7 is a plan view of the parts shown in Fig. 6.

Fig. 8 is a section taken along the line 8—8 of Fig. 7.

While I have shown in the drawings and will describe in detail the best known embodiment of the invention for purposes of illustration, it is to be understood that I do not intend to be limited thereby to the form disclosed, but aim to cover all modifications and alternative constructions falling within the spirit and scope of the appended claims.

The invention in the exemplary embodiment shown in the drawings comprises a suitable tractor vehicle, a trailer frame having a low load platform and vertical standards at the forward end of the platform supporting a raised frame structure which rests upon the rear end of the tractor during combined operation of the two vehicles, vertically slidable members mounted in said standards and arranged to support the forward end of the trailer when it is detached from the tractor, a coupling carriage mounted to slide back and forth in the raised portion of the trailer frame automatically upon coupling and uncoupling of the vehicles, and toggle mechanism operatively connected to said carriage and said supporting members whereby horizontal movements of the former will move the latter into and out of ground engaging position.

The tractor section of the vehicle is of the type commonly used for hauling semi-trailers having high load platforms and comprises a body frame 10 supported at its rear end by an axle 11 through springs (not shown). Rigidly mounted upon the tractor frame is a horizontal plate 12 which constitutes the stationary member of a fifth wheel support. Preferably the plate has an inclined portion 13 which serves to raise and lower the forward end of the trailer during coupling and uncoupling, thereby allowing for irregularities in the surface upon which the trailer supports rests when detached. Tractive force for hauling the trailer is applied through a king pin 14 suitably mounted on the tractor frame and projecting through the plate 12 preferably in vertical alinement with the axle 11.

The load-carrying platform 15 of the trailer section is built upon a frame 16 composed of a plurality of longitudinally extending channels 17 rigidly connected together by suitable cross pieces 18. Preferably the outer channels are cut short at their rear ends so that the rear end of the platform frame may be received between the supporting wheels 20. In order that the load platform be disposed relatively close to the ground, the frame 16 may be supported at its rear ends by springs (not shown) upon an underslung axle 21 extending between the wheels 20. In the present instance the clearance between the platform frame 16 and the ground is approximately fifteen inches.

Positioned in a plane above the platform frame 16 and projecting forwardly therefrom so as to overlie the rear end of the tractor is an auxiliary frame structure 22 which carries the mechanism for coupling the trailer to the tractor. This frame consists of two horizontal channel bars 23 rigidly connected by cross pieces 24 and supported at their rear ends by laterally spaced vertical standards in the form of channels 25. The latter are secured at their lower ends to the channels 17 and to the foremost cross piece 18 of the platform frame. Six of these standards are provided in the present instance, the two inner ones being secured directly to the rear ends of the bars 23 and the outer ones being connected to the bars by side braces 26. Suitable bars 27 serve to brace the frame 22 against vertical movement relative to the standards. Rollers 28 are mounted on the forward ends of the channels 23 so as to ride up and down the inclined track 13 on the tractor during coupling and uncoupling of the tractor and trailer.

In the present instance the landing mechanism for supporting the forward end of the trailer when detached from the tractor comprises a pair of vertical supports or legs 30 preferably in the form of channels, one slidably mounted between the two inner standards 25 on either side of the trailer frame. Each leg is held against the cross member 18 and guided in its vertical movement by suitable brackets 31 and 32. In this instance, the bracket 31 is a U-shaped plate secured to a channel 33 which connects the standards 25 at their upper ends, and the bracket 32 is an angle bar secured to the frame channels 17. A foot 34 having forwardly and rearwardly projecting portions is provided on the lower end of each leg 30. It will be observed that as the legs 30 slide vertically, the feet 34 will move up and down in the space between the ground and the under side of the platform frame. When the legs are in their raised position, proper clearance between the feet and the ground is afforded.

Means is provided for maintaining the supporting legs in raised position when the trailer is coupled to the tractor (see Fig. 3) and for sustaining the weight of the trailer on the legs when they are lowered to the ground (see Fig. 4). The means shown herein for this purpose comprises a pair of alined transverse shafts 35, one located behind each supporting leg about midway between the platform frame 16 and the auxiliary frame 22. Each shaft is journaled in bearing brackets 36 on the standards 25 and each is connected to one of the supporting legs by a pair of crank arms 37 and two toggle links 38. The crank arms 37 are keyed or otherwise fixed to their shaft on opposite sides of the supporting leg and have their free ends pivotally connected to the links 38. At the opposite ends, the links 38 are pivotally connected to plates 39 fastened to flanges of the leg channels. Thus, the cranks 37 and links 38 are arranged to constitute toggle linkages which, when flexed by oscillation of the shafts 35, will slide the legs vertically. Preferably the arrangement is such that each toggle will be flexed through and a little beyond the straight or alined position of its links as the supporting legs are moved from inactive to active position (see Fig. 4). In this position of the links, the weight of the trailer acting vertically through the legs will tend to flex the toggles further and thereby allow the trailer to be lowered. Such movement is prevented by a suitable stop rod 40 against which the cranks 37 strike after the links have been flexed to a point "over center" or slightly beyond their alined position. Thus, the weight of the trailer on the legs is applied endwise of the toggles and is sustained by the shafts 35. By rotating the shafts 35 counterclockwise when the legs are in the position shown in Fig. 4, the toggles will be flexed in the opposite direction through the alined position of their links, and the supporting legs will be raised to the position shown in Fig. 3, this movement being arrested as the feet 34 strike the angle bars 32.

Suitable mechanism is employed for oscillating the shafts 35 and thereby moving the legs into and out of supporting position. In the present embodiment of the invention, this oscillation is effected automatically by the reciprocation of two rods 41 pivotally connected at their forward ends to a coupling carriage 42 which is mounted in the forward end of the auxiliary frame 22 and adapted to slide back and forth upon coupling and uncoupling of the tractor and trailer. This particular form of coupling mechanism forms the subject matter of my copending application, Serial No. 92,428, filed Mar. 5, 1926. At their rear ends the rods 41 are pivotally connected to the free ends of crank arms 43 one fixed to the inner end of each of the shafts 35. Preferably the cranks 43 are arranged to project upwardly and forwardly when the supporting legs are active (see Fig. 4) and upwardly and rearwardly when the legs are in raised position, (see Fig. 3). With this arrangement, the supporting legs will be lowered as the carriage moves forwardly and raised as it moves rearwardly.

The coupling carriage 42 for actuating the slide rods 41 will now be briefly described. Referring particularly to Figs. 6, 7 and 8, the frame of the carriage comprises two parallel channels 44 joined together by a bar 45 and a casting 46, the latter having spaced top and bottom walls. The carriage is held in the trailer frame by outwardly projecting flanges 47 (see Fig. 8) which overlie horizontal flanges 48 of angle bars secured along the inner side of the frame channels 23. Pivotally mounted on the carriage is a movable fifth wheel member 49 adapted to rest upon the plate 12 of the tractor and sustain the weight of the trailer when the vehicles are coupled together. The weight of the trailer on the carriage is sustained by wheels 50 on the ends of transverse axles 51 journaled in the carriage frame. As the carriage slides back and forth in the trailer frame, the wheels 50 will roll along the under side of the flanges 48. To hold the carriage against lateral movement, rolls 52 are mounted in the casting 46 to roll along a pair of parallel I-beams 53 rigidly supported from cross members 24 of the auxiliary frame 22.

Pivoted on vertical pins 54 between the top and bottom walls of the casting 46 are two coupling jaws 55 formed with opposite concave surfaces which constitute a socket for the spherical portion of the tractor king pin 14. At their forward ends, the jaws are provided with rollers 56 which are received in recesses 57 in the I-beams 53 when the coupling socket is open (see Fig. 7) and which ride along the inner sides of the I-beams to hold the socket closed as the carriage slides toward and from its rearward position. An arm 58 pivoted on the front axle 51 and spring pressed downwardly, serves to hold the jaws spread apart when the carriage is in its forward position (see Fig. 7), that is, when the trailer is detached from the tractor.

It will be understood that as the tractor is backed under the trailer, the king pin 14 will strike against projections 59 on the jaws thereby closing the coupling socket about the king pin. Continued rearward movement of the tractor slides the carriage rearwardly until the ends of the carriage channels 44 strike against stops 60 on brackets 61 which are rigidly mounted on the frame channels 23.

As a part of the coupling mechanism on the trailer, two latch hooks 62 are mounted on the carriage 42 in position to be depressed by brackets 61 and to spring up behind shoulders 63 on the brackets as the carriage is moved into its rearmost position during coupling of the tractor and trailer. In the present instance, the hooks 62 are formed integrally with a sleeve 64 on the rear carriage axle 51 and are pressed upwardly by springs 65 which acts downwardly on a Z-shaped member fixed to the sleeve. After the hooks have become latched behind the shoulders 63, the carriage will be held against forward movement in the trailer frame and the vehicles will be ready for combined operation, during which the pull of the tractor will be applied directly to the trailer frame through the coupling carriage.

To release the latch hooks so that the tractor and trailer can be uncoupled, a shaft 66 is journaled in one of the brackets 61 and is provided at its inner end with a cam member 67 having a shoulder overlying the adjacent latch hook 62. By means of a crank 68 and a rod 69 this shaft is connected to an operating lever 70 on the trailer frame. When the lever is pulled forward the shaft 66 will be oscillated and the hooks 62 will be depressed so as to allow them to pass beneath the brackets as the carriage moves forwardly with the tractor. When the carriage reaches the forward limit of its travel, the coupling jaws are automatically spread apart thereby freeing the trailer from the tractor.

The operations of coupling and uncoupling the tractor and trailer are as follows, assuming the parts to be positioned as shown in Figures 4 and 6. In coupling, the rear wheels of the trailer are blocked against backward movement. The tractor is then backed under the trailer, the wheels 28 and the fifth wheel member 49 riding onto the plate 12 and the king pin 14 entering the coupling socket formed by jaws 55. Continued backward movement of the tractor closes the jaws about the king pin and slides the carriage 42 and rods 41 rearwardly thereby oscillating the shafts 35 and raising the supporting legs into the position shown in Fig. 3. By this time the carriage will have reached its rearmost position and the hooks 62 will then be locked behind the brackets 61, and the vehicles will then be ready for combined operation.

Preparatory to uncoupling, the rear trailer wheels are blocked against forward movement and the lever 70 is pulled forward to release the latch hooks 62. Then, as the tractor pulls away from the trailer, carrying with it the coupling carriage 42, the rods 41 will be moved forwardly causing the toggle mechanism to lower the supporting legs into their ground engaging position. By this time the carriage will have reached its forward limit of travel, the coupling jaws then being spread apart so as to free the tractor king pin. As the tractor continues to move away from the trailer, the wheels 28 will roll down the incline 13 lowering the forward end of the trailer until the feet 34 of the supporting legs rest firmly upon the ground. The lever 70 on the trailer should then be released preparatory to coupling of the tractor and trailer.

It will be apparent that the present trailer is extremely rugged in construction, efficient in operation and capable of handling heavy machines and the like with great facility. Furthermore, it will be observed that except for irregularities in the ground upon which the trailer rests, the forward end of the load carrying platform is positioned practically at a constant level at all times. The clearance between the supporting legs and the ground when the vehicles are coupled is such that there is little danger of the legs engaging obstructions in the road.

I claim as my invention:

1. A vehicle having, in combination, a tractor, a trailer frame having a low load platform and a raised portion adapted to overlie and rest upon the tractor, wheels supporting said trailer frame at its rear end, a vertical supporting leg slidably mounted at the forward end of said platform, a shaft, toggle links connecting said leg and shaft, actuating mechanism slidably mounted in the raised portion of said frame, and means connecting said shaft and mechanism whereby sliding of the latter will oscillate said shaft and shift said supporting leg.

2. A semi-trailer having, in combination, a body frame, wheels supporting the rear end of said frame, a supporting leg slidably mounted in said frame, a shaft journaled in said frame behind said leg, a pair of crank arms fixed to said shaft, a link pivotally connected to said leg and to one of said crank arms, a rod connected to said other crank arm for oscillating said shaft whereby to slide said leg, and means for reciprocating said rod.

3. A semi-trailer having, in combination, a body frame, wheels supporting the rear end of said frame, a slidable supporting leg, a pair of pivoted toggle links, one connected to said leg and the other mounted to turn on a fixed axis, means for flexing said toggle links to move said leg into and out of active position, and means engaging one of said links to prevent flexing of the toggle by the weight of the trailer acting on said toggle.

4. A semi-trailer having, in combination, a body frame, wheels supporting the rear end of said frame, a slidable supporting leg, and means to move said leg comprising a pair of toggle links arranged to be flexed through their alined position as said leg moves from inactive to active position, and means for limiting the flexing of said toggle at a fixed point beyond said alined position.

5. A semi-trailer having, in combination, a body frame, a vertically slidable leg adapted to support the forward end of said frame, a pair of pivoted toggle links, one connected to said leg and the other mounted to turn on a fixed horizontal axis, said links being arranged to pass through their alined position as said leg is raised and lowered, means for flexing said links, and means arranged to limit the flexing of said links at a point slightly beyond their alined position after the leg has been moved into active position.

6. A combined vehicle of the character described comprising, in combination, a tractor, a semi-trailer having a frame with a low load-platform and a portion at its forward end adapted to overlie and rest upon the tractor, a vertically movable supporting leg mounted at the forward end of said load platform and adapted to sustain the weight of the forward end of the trailer when detached from the tractor, a crank arm connected to said leg and mounted on said frame for oscillation about a fixed axis located adjacent said vertically movable leg, said arm being adapted by movement in opposite directions to raise and lower said leg, and means for oscillating said crank including a slidable mechanism mounted in the overlying portion of said frame and arranged to be actuated by the tractor in coupling to or uncoupling from the trailer.

7. A combined vehicle of the character described comprising, in combination, a tractor, a semi-trailer having a frame with a low load-supporting platform and a portion of its forward end adapted to overlie and rest upon the tractor, a movable supporting leg mounted at the forward end of said load platform and adapted to sustain the weight of the forward end of the trailer when the trailer is detached from the tractor, a pair of pivotally connected toggle members, one connected to said supporting leg, the other being mounted for oscillation about a fixed axis, said toggle members being flexed substantially into longitudinal alinement by movement of said leg into active position, and a slidable mechanism mounted in the overlying portion of said frame and arranged to be actuated by the tractor to flex said toggle members and move said leg between active and inactive positions.

In testimony whereof, I have hereunto affixed my signature.

ADDI BENJAMIN CADMAN.